Nov. 2, 1943.   C. E. HEGG   2,333,250
LATHE BED
Filed Feb. 12, 1940
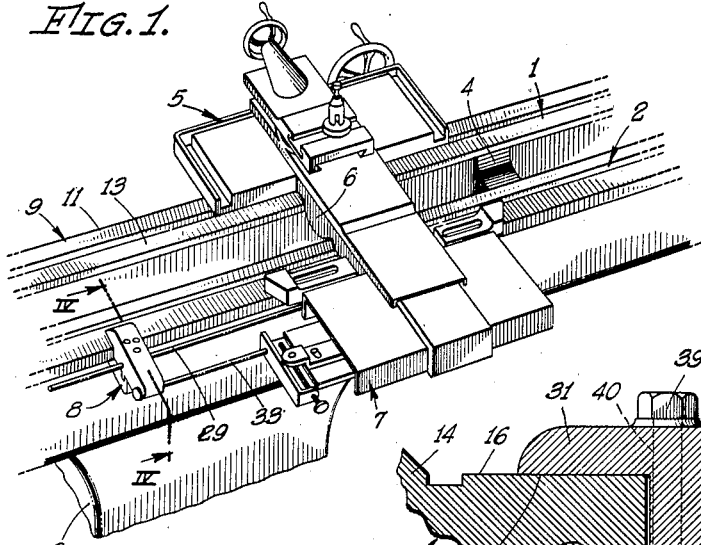
INVENTOR.
CARL E. HEGG
BY
ATTORNEY.

Patented Nov. 2, 1943

2,333,250

UNITED STATES PATENT OFFICE 2,333,250

LATHE BED

Carl E. Hegg, Huntington Park, Calif., assignor to Axelson Manufacturing Co., Los Angeles, Calif., a corporation of California Application February 12, 1940, Serial No. 318,409

1 Claim. (Cl. 82—32)

My invention relates to guideways for carriages, especially in metal working machinery, and is exemplified in a lathe. My invention relates particularly to means for supporting and guiding carriages on the supports or beds therefor.

Many machine tools, such as lathes and the like, employ V-ways which coact with V-shaped grooves in the carriage for supporting and guiding the carriage in its longitudinal movement along the bed. When these V-ways are subjected to the stresses set up by the high cutting speeds used and the heavy cuts taken in present day practice, such V-ways have proven insufficient in several respects. The stresses which the V-ways are required to withstand result from the reaction of the tool with the workpiece which is cut thereby, these reactions constituting forces which normally are not applied to the carriage at its exact center of reaction so that there is produced a couple tending to rotate the carriage about a vertical axis.

This tendency of the carriage to rotate in a horizontal plane causes the carriage to climb on the guideways are usually heretofore constructed, resulting in the lateral wearing of the walls of the V-grooves in the carriage and of the V-ribs on the bed. The wear on the walls of the grooves in the carriage causes the worn walls to become flaring and the ends of the grooves to become bell-mouthed.

The same reaction forces resulting from the engagement of the tool with the workpiece produce another couple tending to overturn the carriage about a horizontally disposed axis. In conventional constructions this overturning couple is often resisted by means of a gib which engages a flat undersurface on the rear slideway and operates to hold the carriage downwardly into firm engagement with the guide surface formed on the rear slideway. This construction is well suited to resisting the aforementioned overturning couple only if the gib remains in snug engagement with its bearing surface, and any wear which tends to loosen the engagement, as for example the normal wearing down of the upper guide surface or the bearing surface of the carriage, destroys the efficacy of this gib, requiring frequent adjustment thereof.

In spite of these various disadvantages the V-way type of guides for carriages is conceded to be the best type of guiding arrangement at present available and it has, prior to my invention, been impossible to overcome the disadvantages residing in the conventional constructions without relinquishing the admitted advantages afforded by the V-type of guiding ways.

It is accordingly an object of my invention to provide a lathe bed and carriage construction employing V-guides in which means is provided for overcoming the above noted disadvantages found in conventional bed constructions.

It is also an object of my invention to provide a lathe bed construction having a rear slideway adapted to cooperate with a carriage or other sliding member mounted thereon to prevent rotation of said slide about a vertical axis.

It is a still further object of my invention to provide a lathe bed construction of the character set forth in the preceding paragraph in which a downwardly facing guiding groove is provided in the rear slideway for receiving a gib carried by the carriage or other sliding member to prevent rotational and upward movement of the slide.

It is also an object of my invention to provide a lathe bed construction of the character set forth in the preceding paragraphs in which the groove defines a downwardly facing guide surface inclined inwardly and upwardly at an angle to the horizontal, whereby a single gib may be employed to resist the aforementioned movements of the carriage or other sliding member associated therewith.

It is a further object of my invention to provide a lathe employing a bed of the character set forth hereinbefore in which the gib is mounted on the carriage for adjustable movement at an angle to the guide surface to provide for taking up wear in the slideways, and providing for a relatively great, recognizable movement of the gib to take up for a relatively small amount of wear.

In addition to the foregoing objects, the provision of a rear slideway, as set forth in the preceding paragraphs, on the lathe or machine bed provides for the ready attachment thereto of taper attachments in a manner which will effectively increase the accuracy with which such attachments can be set and maintained during such times as they are used.

Such taper attachments as are commonly used in connection with lathes usually include a clamping body which must be fixed upon or relative to the lathe bed to hold the stationary member of the taper attachment against longitudinal movement therealong as the carriage moves along the bed, such clamps engaging upper and lower parallel surfaces upon the slideway of the lathe bed. Such clamps, therefore, depend entirely upon the gripping action of the clamp upon these parallel surfaces to hold the clamp against longitudinal movement along the lathe bed and also to prevent rocking or rotational movement relative to the lathe bed when subjected to the tremendous forces exerted thereon while the taper attachment is in operation.

The employment of my new slideway construction provides non-parallel surfaces for the reception of such clamps, and it is therefore an object of my invention to provide slideways on the lathe bed by which such clamps may be engaged with the lathe bed to effectively prevent both longitudinal motion and rotational movement of the clamp relative to the bed.

Other objects and advantages of my invention will be apparent from a study of the following specifications, read in connection with the accompanying drawing, wherein:

Fig. 1 is a fragmentary perspective view illustrating one form of lathe bed of my invention as having a carriage and taper attachment mounted thereon;

Fig. 2 is an enlarged fragmentary view with parts in cross section showing the configuration of the slideways employed and the manner in which the carriage cooperates therewith;

Fig. 3 is a fragmentary vertical section illustrating the shape of the downwardly facing guiding groove and one form of gib adapted to cooperate therewith; and Fig. 4 is a fragmentary vertical section taken substantially along the line IV—IV of Fig. 1 to show the details of construction of one form of taper attachment slide and the manner in which it cooperates with the rear slideway of my invention.

Referring to the drawing, I have illustrated in Fig. 1 the preferred embodiment of my invention as being incorporated in a substantially conventional lathe bed construction which ordinarily includes a pair of spaced slideways 1 and 2 which may be supported in the proper parallel spaced relation to each other by means of supporting members 3 and held in relative alignment by means of cross members 4.

Upon this bed is mounted a conventional carriage construction 5 including a carriage saddle plate 6 upon the rear end of which is affixed a taper attachment 7. The taper attachment 7 includes a taper attachment slide clamp 8 adapted to slide along the rear slideway 2 with the movements of the carriage 5 whenever the taper attachment is not in use and which is adapted to be securely clamped to the rear slideway 2 whenever it is desired to employ the taper attachment for the cutting of conical or tapered members.

As is more clearly illustrated in Fig. 2, the front or apron side slideway 1 is of conventional construction including a front V-way 9 having front and rear guiding V-surfaces 10 and 11 adapted to be received in a correspondingly shaped V-groove 12 formed in the underside of the carriage saddle plate 6. The front slideway 1 also includes a substantially horizontal shear 13 adapted to cooperate with a coacting V-rib 14 formed on the rear slideway 2 for the supporting and guiding of other machine tool elements such as a headstock and a tailstock.

The carriage saddle plate 6 is provided at its rear end with a substantially flat horizontally extending surface 15 which rests upon a rear shear 16 formed on the upper surface of the rear slideway 2. The front V-way 9 and the rear shear 16 coact to support the carriage saddle plate 6 and guide it in its longitudinal movements along the length of these slideways. The front end of the carriage 5 may be prevented from moving upwardly relative to the front slideway 1 by means of a front gib (not shown) which is engaged with a horizontal undersurface 17 provided on the front slideway 1.

My invention is directed to an improved construction of the rear slideway 2 residing in the provision of a downwardly directed groove 18 which is formed in the underside of the rear slideway rail 2 and which defines a guiding surface 19 inclined inwardly toward the front slideway and upwardly at an angle to the horizontal. This groove is adapted to cooperate with an adjustable gib 20 secured to a depending portion 21 of the carriage and which is provided with a similarly directed surface bearing snugly against the guiding surface 19 so as to positively prevent upward movement of the saddle plate 6.

The snug engagement between the gib 20 and the guiding surface 19 also positively prevents any pivotal movement of the carriage in a horizontal plane by reason of the fact that the upwardly sloping surface 19 provides a forwardly directed surface against which the gib 20 seats, and any attempted horizontal rotary movement of the carriage will be resisted by a horizontal thrust exerted between the gib and the sloping guiding surface 19. The coaction between the gib 20 and the guiding surface 19 thus operates to perform those of the functions of holding the carriage in alignment which previously caused the greatest wear on the coacting surface of the front V-guides and thus operates to prevent the development of wavy and inaccurate surfaces and belling out of the ends of the V-grooves in the carriage.

My invention also provides a ready means of taking up such wear as may occur to destroy the previously described snug engagement between the surface 19 and the gib 20. This is accomplished by securing the gib 20 to the depending portion 21 for adjustable movement relative thereto along a plane 22 directed at an angle to the plane of the guiding surface 19. The gib 20 may accordingly be secured to the depending portion 21 as by means of clamp bolts 23 threadedly engaged with the depending portion and passed through suitable elongated openings provided in the gib 20 so that loosening the clamping bolts 23 will permit the gib 20 to be slid inwardly and outwardly along the plane 22.

The amount of such movement may be readily controlled by an adjusting means such as that illustrated in Fig. 3. The rear face of the gib 20 is preferably provided with a plurality of segmental recesses 24 each having a threaded bore 25 axially aligned therewith and adapted to receive the threaded end of an adjusting screw 26. The shank of the screw 26 is provided with a circular flange 27 having a diameter substantially equal to the diameter of the segmental cross section of the recesses 24, the upper edge of the flange 27 being received in arcuate recesses formed in the lower edge of the depending portion 21 so that rotation of the screw will operate to move the gib 20 from some inward position as indicated by dotted lines in Fig. 3 and a snug fit position as indicated by solid lines in this figure.

It will be noted that moving the gib 20 rearwardly relative to the depending portion 21 operates to pull the rear end of the saddle plate 6 downwardly to eliminate any vertical slack and bring the gib 20 into snug engagement with the guiding surface 19. Such adjustable movement of the gib 20 may accordingly be employed to take up wear at the two rear guiding surfaces 16 and 19 to remove all of the slack at these surfaces, irrespective of the relative magnitudes of such slack.

In addition to the tendencies of the carriage to rotate in a horizontal plane and to lift at the rear end, the reaction of the tool with the workpiece causes increased pressures on the rear surface 11 of the front V-way 9 so as to cause increased wear on this surface as compared with the front surface 10 thereof. This wear results in a certain amount of "looseness" in the guiding mechanism at this point which may be taken up in conventional construction by adjusting the front gib. Such adjustment, however, tends to move the carriage forwardly a slight amount so as to introduce a small amount of slack between the rear gib 20 and its guiding surface 19. Rearward adjusting movement of the gib 20 as hereinbefore described accordingly results in taking up of this slack simultaneously with the taking up of slack to prevent vertical movement and pivotal movement about a vertical axis.

Furthermore, the above described adjustable mounting of the gib 20 permits a machinist to readily effect any desired adjustment since the angularity of the surface 19 relative to the plane 22 of adjustable movement requires a relatively large movement of the gib 20 in order to obtain a relatively small take-up effect, thus permitting the adjusting screws to be rotated through a substantial part of a revolution in making such adjustment so as to provide a fine control thereover and permit a machinist to accurately judge or gauge the effect of such adjustment and to readily control the degree of such adjustment and insure uniformity of adjustment between the ends of the gib.

It will be observed that the foregoing construction including the downwardly facing groove 18 which is formed in the underside of the rear slideway together with the adjustable gib 20 which is received therein operates to effectively resist any tendency of the rear end of the carriage to lift relative to the bed, thus relieving the front V-ways from the relatively large forces which would be imposed by the previously described overturning couple were this construction not provided. Similarly, the coaction between the gib 20 and the guiding surface 19 upon which it bears operates to effectively prevent any pivotal movement of the carriage about a vertically disposed axis so as to relieve the front V-ways 9 of the stresses which are imposed by the aforementioned tendency of the carriage to so pivot.

The novel construction of my invention accordingly supplies the deficiencies which are found in conventional lathe bed constructions while retaining all of the advantageous features of such constructions which reside in the employment of V-types of guides for guiding the carriage during its longitudinal movement along the length of the bed.

It will be further observed that the novel machine tool bed construction of my invention provides also a single adjusting means for taking-up whatever slack may exist between a number of the coacting guiding surfaces at the rear of the lathe.

The slideway construction of my invention also provides for the clamping of a taper attachment slide thereto in such manner as to obviate any possibility of pivotal movement of the slide about a vertical axis after it has been clamped.

The taper attachment clamp slide 8 is ordinarily secured to the carriage by means of a tension member or rod 29 which is secured to the saddle plate 6 and passed through an opening 30 formed in a body portion 31 of the slide 8 and adapted to be immovably clamped thereto by means of a clamping screw 32. Whenever it is desired to employ the lathe for cutting tapers, the carriage is permitted to move relative to the slide 8 as by releasing the clamping screw 32 to allow the rod 29 to slide within the bore 30 and the slide 8 is immovably clamped to the rear slideway 2 so that the carriage will move relative to the taper way portions of the taper attachment 7 which are in turn coupled to the slide 8 as by means of another tension member 33 which is securely anchored in the body portion 31 of the slide 8.

The locking or clamping of the slide plate 31 to the rear slideway 2 may be effected by providing on the slide plate 31 a lower surface 34 adapted to engage the aforementioned shear 16 and cooperate with a gib 36 having an upwardly directed clamping face 37 adapted to be drawn into clamping engagement with the guiding surface 19. Clamping bolts 39 may be passed through suitable bores 40 in the slide plate 31 and threadedly engaged with the gib 36 so as to move the clamping surface 37 into firm engagement with the guiding surface 19 when these bolts are tightened and horizontal movement of the gib 36 relative to the plate 31 may be avoided by inter-engaging these members by a tongue and groove construction 41.

As will be understood by those skilled in this art, the engagement of the clamping faces of the slide plate 31 of the gib 36 with the angularly disposed surfaces on the lathe bed will tend to draw the slide clamp forwardly of the machine and it is therefore necessary to provide some means for limiting this forward motion to avoid inadvertent loosening of the slide clamp and to prevent the amount of such forward motion from imposing warping strains upon the rods 29 and 33. This may be readily accomplished as by providing a surface 42 upon either the slide plate 31 or its associated gib 36 so disposed relative to the angular face of the gib 36 as to abut the vertical thrust surface 43 at the rear of the lathe bed when the angular surface 37 of the gib 36 is drawn into clamping relation with the guiding surface 19 of the lathe bed.

In the form of the device illustrated in Fig. 4 the limiting surface 43 is illustrated as being disposed upon the gib 36 so that when the gib 36 is loosened, it will be free to slide relative to the lathe bed while normal clearances are provided on the plate 31 to readily clear the rear surface 42 during the normal sliding action of the slide clamp relative to the lathe bed.

It will be observed that by clamping the slide plate 31 to the rear slideway 2 in this fashion, all possibility of the slide plate 31 moving in a pivotal fashion about a vertical axis is obviated since any such pivotal movement would require that at least a portion of the slide plate 31 and the gib 36 be moved horizontally outward relative to the slideway 2, such outward movement being effectively prevented by the inter-engagement of the surfaces 19 and 37.

From the foregoing it will be observed that I have provided a novel machine tool bed construction, particularly as regards improvements in the rear slideway construction and that this improvement permits the use of slides and carriages on conventional V-way guides while overcoming disadvantages and difficulties previously encountered by bed constructions employing such V-guides.

While I have shown and described the rear slideway construction of my invention as being employed upon an engine lathe, it is to be understood that such construction may be employed upon the beds of machine tools which are subjected to the same types of forces as are the beds of engine lathes.

While I have shown and described the preferred embodiment of my invention, I do not desire to be limited to any of the details of construction shown or described herein, except as defined in the appended claim.

I claim:

In a machine tool having front and rear slideways for slidably supporting a carriage, the combination of: a carriage saddle plate resting upon said slideways; a rear shear for supporting the rear end of said saddle plate and for resisting downward movement thereof; a depending portion on said saddle plate extending downwardly outside of said shear; a gib secured to said depending portion and extending inwardly thereof below said shear; a downwardly facing guide surface below said shear for engagement by said gib, said guide surface extending inwardly and upwardly at an acute angle to the horizontal for resisting upward and rearward movement of said saddle plate; and means for moving said gib relative to said depending portion along a plane disposed at an angle to the plane of said guide surface, whereby said gib may be moved to take up wear in said slideways.

CARL E. HEGG.